United States Patent
Lee et al.

(10) Patent No.: US 11,407,206 B2
(45) Date of Patent: *Aug. 9, 2022

(54) MULTILAYER FILMS AND METHODS THEREOF

(71) Applicant: Dow Global Technologies LLC, Midland, MI (US)

(72) Inventors: Jong Young Lee, Sugar Land, TX (US); Hrishikesh R. Munj, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/310,087

(22) PCT Filed: Aug. 8, 2017

(86) PCT No.: PCT/US2017/045824
§ 371 (c)(1),
(2) Date: Dec. 14, 2018

(87) PCT Pub. No.: WO2018/038905
PCT Pub. Date: Mar. 1, 2018

(65) Prior Publication Data
US 2019/0322086 A1  Oct. 24, 2019

Related U.S. Application Data

(60) Provisional application No. 62/378,859, filed on Aug. 24, 2016.

(51) Int. Cl.
*B32B 27/08* (2006.01)
*B29C 48/16* (2019.01)
*B29C 48/00* (2019.01)
*B29C 48/88* (2019.01)
*B29D 23/24* (2006.01)
*B32B 27/32* (2006.01)
*B29K 23/00* (2006.01)
*B32B 7/06* (2019.01)

(52) U.S. Cl.
CPC .......... *B32B 27/08* (2013.01); *B29C 48/0018* (2019.02); *B29C 48/16* (2019.02); *B29C 48/912* (2019.02); *B29D 23/24* (2013.01); *B32B 7/06* (2013.01); *B32B 27/32* (2013.01); *B29K 2023/0633* (2013.01); *B29K 2023/08* (2013.01); *B32B 2307/72* (2013.01); *B32B 2307/748* (2013.01); *B32B 2439/70* (2013.01)

(58) Field of Classification Search
CPC ... B32B 27/08; B32B 27/327; B32B 2307/72; B32B 2439/70; B32B 2270/00; B32B 2307/30; B32B 2439/02; B32B 2307/744; B29C 48/16; B29C 48/0018; B29C 48/912; B29C 23/24
See application file for complete search history.

(56) References Cited

U.S. PATENT DOCUMENTS

| | | |
|---|---|---|
| 3,318,538 A | 5/1967 | Needham |
| 5,272,236 A | 12/1993 | Lai et al. |
| 5,292,845 A | 3/1994 | Kawasaki et al. |
| 6,100,341 A | 8/2000 | Friedman |
| 6,111,019 A | 8/2000 | Arjunan et al. |
| 6,242,545 B1 | 6/2001 | Jejelowo et al. |
| 6,486,284 B1 | 11/2002 | Karande et al. |
| 6,521,338 B1 | 2/2003 | Maka |
| 7,078,467 B1 | 7/2006 | Kolb et al. |
| 7,498,282 B2 | 3/2009 | Patel et al. |
| 7,608,668 B2 | 10/2009 | Li Pi Shan et al. |
| 8,372,931 B2 | 2/2013 | Hermel-Davidock et al. |
| 11,123,953 B2 * | 9/2021 | Lee ............................ B32B 7/12 |
| 2008/0038571 A1 | 2/2008 | Klitzmiller et al. |
| 2008/0176981 A1 | 7/2008 | Biscoglio et al. |
| 2010/0129632 A1 | 5/2010 | Eichbauer et al. |
| 2011/0311792 A1 * | 12/2011 | Batra ........................ B32B 7/06 |
| | | 428/213 |
| 2014/0248480 A1 | 9/2014 | Vinck et al. |
| 2014/0272443 A1 | 9/2014 | Kinnan et al. |
| 2017/0326853 A1 * | 11/2017 | Lee ........................... B32B 27/08 |

FOREIGN PATENT DOCUMENTS

| | | |
|---|---|---|
| WO | 93/03093 A1 | 2/1993 |
| WO | 1998021276 A1 | 5/1998 |
| WO | 2016/069406 A1 | 5/2016 |
| WO | 2017/039987 A1 | 3/2017 |

OTHER PUBLICATIONS

ExxonMobil EXACT Plastomer 0201 datasheet (Year: 2009).*
ExxonMobil VISTAMAXX 6102FL datasheet (Year: 2017).*
ExxonMobil VISTAMAXX 6202 datasheet (Year: 2017).*
Monrabal et al., Macromol. Symp. 257, 71-79 (2007).
PCT/US2017/045824, International Search Report and Written Opinion dated Nov. 7, 2017.
PCT/US2017/045824, International Preliminary Reporton Patentability dated Feb. 26, 2019.

* cited by examiner

*Primary Examiner* — Scott R. Walshon

(57) ABSTRACT

Embodiments disclosed herein include multilayer blown films having a cling layer and a release layer, wherein the cling layer comprises (i) an ethylene/alpha-olefin elastomer, and (ii) a polyethylene polymer selected from ultra-low density polyethylene, a very low density polyethylene, or combinations thereof, and the release layer comprises an ethylene/alpha-olefin resin.

10 Claims, No Drawings

MULTILAYER FILMS AND METHODS THEREOF

TECHNICAL FIELD

Embodiments of the present disclosure generally relate to multilayer films, and more particularly, to multilayer films having a high cling force, low unwind force, and are substantially free of polyisobutylene (PIB).

BACKGROUND

Multilayer films are often used in packaging, and may package diverse items, such as, bulk farm materials like grass and hay to small grocery store items like meats and vegetables. For all of these items it is usually desirable to have a strong, stretchy film that has a sufficient level of tack or cling such that the film can releasably adhere to itself and/or an article that is wrapped with the film.

To achieve the desired level of cling, additives, such as PIB, may be incorporated into a cling layer to improve the tack of the cling layer. However, films that include such additives can have one or more drawbacks such as 1) being excessively noisy when unwound from a film-roll when utilized on a high speed wrapping machine, 2) having to be aged for a period of time so that the additive migrates to the surface of the film (i.e., blooms) during the aging period, 3) contaminating process equipment, and 4) causing two-sided cling when one-sided cling is desired. In addition, such additives can cause undue handling issues when they are in liquid form and drip to an undue degree from process equipment.

The multilayer films may also incorporate high levels of ethylene/alpha-olefin elastomers to achieve a higher level of tack or cling; however, ethylene/alpha-olefin elastomers can make the multilayer films very expensive. In addition, the films can be difficult to process using blown film techniques when ethylene/alpha-olefin elastomers are used at high levels (e.g., greater than 90% by weight in a cling layer) because of their tackiness.

In addition to cling force, unwind force is also a critical property to determine the performance of stretch cling film. When films have a high unwind force, film blocking and tearing can occur. The release layer plays a part in determining the unwind force of a film. Some release layers have been adapted to lower the unwind force, e.g., higher than 70 wt. % of LDPE is blended into the release layer; however, the cling force is often compromised.

Accordingly, alternative multilayer films may be desired having improved properties, such as, high cling, low unwind force, while also being cost-effective and/or relatively easy to fabricate using blown film techniques.

SUMMARY

Disclosed in embodiments herein are multilayer blown films. The multilayer blown films have a cling layer and a release layer. The cling layer comprises (i) an ethylene/alpha-olefin elastomer having a density in the range of 0.855 to 0.890 grams/cm$^3$ and a melt index ($I_2$) in the range of 0.1 to 30 grams/10 minutes; and (ii) a polyethylene polymer selected from ultra-low density polyethylene, a very low density polyethylene, or combinations thereof, wherein the polyethylene polymer has a density in the range 0.885 to 0.915 grams/cm$^3$, a melt index ($I_2$) in the range of 0.1 to 30 grams/10 minutes, and a purge fraction greater than 20 percent as determined by the Crystallization Elution Fractionation (CEF) test method. The release layer comprises an ethylene/alpha-olefin resin that is characterized by the following properties: (a) a melt index, $I_2$, of from 0.1 to 30 g/10 min, (b) a density of from 0.910 to 0.930 g/cc, and (c) a purge fraction of less than 2% as determined by the Crystallization Elution Fractionation (CEF) test method.

Also disclosed in embodiments herein are methods of making multilayer films. The methods comprise coextruding a cling layer composition with a release layer composition in an extruder to form a tube having a cling layer and a release layer, and cooling the tube to form a multilayer film. The cling layer compositions comprise (i) an ethylene/alpha-olefin elastomer having a density in the range of 0.855 to 0.890 grams/cm$^3$ and a melt index ($I_2$) in the range of 0.1 to 30 grams/10 minutes; and (ii) a polyethylene polymer selected from ultra-low density polyethylene, a very low density polyethylene, or combinations thereof, wherein the polyethylene polymer has a density in the range 0.885 to 0.915 grams/cm$^3$, a melt index ($I_2$) in the range of 0.1 to 30 grams/10 minutes, and a purge fraction greater than 20 percent as determined by the Crystallization Elution Fractionation (CEF) test method. The release layer composition comprises an ethylene/alpha-olefin resin that is characterized by the following properties: (a) a melt index, $I_2$, of from 0.1 to 30 g/10 min, (b) a density of from 0.910 to 0.930 g/cc, and (c) a purge fraction of less than 2% as determined by the Crystallization Elution Fractionation (CEF) test method.

Additional features and advantages of the embodiments will be set forth in the detailed description which follows, and in part will be readily apparent to those skilled in the art from that description or recognized by practicing the embodiments described herein. It is to be understood that both the foregoing and the following description describe various embodiments and are intended to provide an overview or framework for understanding the nature and character of the claimed subject matter. .

DETAILED DESCRIPTION

Reference will now be made in detail to embodiments of multilayer films and materials used to make such films. The multilayer films may be used in stretch-cling applications. It is noted, however, that this is merely an illustrative implementation of the embodiments disclosed herein. The embodiments are applicable to other technologies that are susceptible to similar problems as those discussed above. For example, the multilayer films described herein may be used as surface protection films, agricultural films, such as silage wrap, or in other flexible packaging applications, such as, shrink films, heavy duty shipping sacks, liners, sacks, stand-up pouches, detergent pouches, sachets, etc., all of which are within the purview of the present embodiments.

In embodiments described herein, the multilayer films comprise a cling layer and a release layer. Optionally, one or more core layers may be positioned between the cling layer and the release layer. The cling layer is an outer layer of the multilayer film that has a sufficient level of adhesive tack such that the cling layer of the multilayer film may form a releasable bond when brought into contact with a surface, such as, the surface of an article or the surface of the release layer. The release layer is an outer layer of the multilayer film that exhibits low adhesion to the cling layer. The release layer can allow for separation to occur between the cling layer/release layer interface on a roll such that the multilayer film may be unrolled from a spool without undue force or without the film tearing.

The thickness of the cling and release layers can vary over a wide range. In some embodiments, the cling layer may have a thickness that is from 5-50 percent of the overall thickness of the film, from 5-30 percent of the overall thickness of the film, or even from 10-30 percent of the overall thickness of the film. The release layer may have a thickness that is from 5-50 percent of the overall thickness of the film, from 5-30 percent of the overall thickness of the film, or even from 10-30 percent of the overall thickness of the film. In some embodiments, where one or more core layers are present, the one or more core layers may have a thickness that is from 0-90 percent of the overall thickness of the film, 10-90 percent of the overall thickness of the film, 20-90 percent of the overall thickness of the film, 30-90 percent of the overall thickness of the film, 40-90 percent of the overall thickness of the film, or 40-80 percent of the overall thickness of the film. The ratio of the thicknesses among a cling layer, a release layer, and any optional core layers can be any ratio that provides desirable properties such as cling, release, and the like. In some embodiments, a multilayer film can have a cling layer thickness, a core layer thickness, and a release layer thickness in a ratio in the range of 1:8:1 to 3:4:3.

Cling Layer

The cling layer may comprise an ethylene/alpha-olefin elastomer and a polyethylene polymer selected from ultra-low density polyethylene, a very low density polyethylene, or combinations thereof. In some embodiments, the cling layer comprises an ethylene/alpha-olefin elastomer and an ultra-low density polyethylene. In other embodiments, the cling layer comprises an ethylene/alpha-olefin elastomer and a very low density polyethylene. In further embodiments, the cling layer comprises an ethylene/alpha-olefin elastomer, an ultra-low density polyethylene, and a very low density polyethylene.

In embodiments described herein, the ethylene/alpha-olefin elastomers may comprise greater than 50%, by weight, of the units derived from ethylene. All individual values and subranges of greater than 50%, by weight, are included and disclosed herein. For example, the ethylene/alpha-olefin elastomer may comprise at least 60%, at least 70%, at least 80%, at least 90%, at least 92%, at least 95%, at least 97%, at least 98%, at least 99%, at least 99.5%, from greater than 50% to 99%, from greater than 50% to 97%, from greater than 50% to 94%, from greater than 50% to 90%, from 70% to 99.5%, from 70% to 99%, from 70% to 97%, from 70% to 94%, from 80% to 99.5%, from 80% to 99%, from 80% to 97%, from 80% to 94%, from 80% to 90%, from 85% to 99.5%, from 85% to 99%, from 85% to 97%, from 88% to 99.9%, 88% to 99.7%, from 88% to 99.5%, from 88% to 99%, from 88% to 98%, from 88% to 97%, from 88% to 95%, from 88% to 94%, from 90% to 99.9%, from 90% to 99.5%, from 90% to 99%, from 90% to 97%, from 90% to 95%, from 93% to 99.9%, from 93% to 99.5%, from 93% to 99%, or from 93% to 97%, by weight, of the units derived from ethylene. The ethylene/alpha-olefin elastomer may comprise less than 50%, by weight, of units derived from one or more alpha-olefin comonomers. All individual values and subranges of less than 50%, by weight, are included herein and disclosed herein. For example, the ethylene/alpha-olefin elastomer may comprise less than 45%, less than 40%, less than 35%, less than 30%, less than 25%, less than 20%, less than 18%, less than 15%, less than 12%, less than 10%, less than 8%, less than 5%, less than 4%, less than 3%, from 0.2 to 15%, 0.2 to 12%, 0.2 to 10%, 0.2 to 8%, 0.2 to 5%, 0.2 to 3%, 0.2 to 2%, 0.5 to 12%, 0.5 to 10%, 0.5 to 8%, 0.5 to 5%, 0.5 to 3%, 0.5 to 2.5%, 1 to 10%, 1 to 8%, 1 to 5%, 1 to 3%, 2 to 10%, 2 to 8%, 2 to 5%, 3.5 to 12%, 3.5 to 10%, 3.5 to 8%, 3.5% to 7%, or 4 to 12%, 4 to 10%, 4 to 8%, or 4 to 7%, by weight, of units derived from one or more alpha-olefin comonomers. The comonomer content may be measured using any suitable technique, such as techniques based on nuclear magnetic resonance ("NMR") spectroscopy, and, for example, by 13C NMR analysis as described in U.S. Pat. No. 7,498,282, which is incorporated herein by reference.

Suitable alpha-olefin comonomers include those containing from 3 to 20 carbon atoms (C3-C20). For example, the alpha-olefin may be a C4-C20 alpha-olefin, a C4-C12 alpha-olefin, a C3-C10 alpha-olefin, a C3-C8 alpha-olefin, a C4-C8 alpha-olefin, or a C6-C8 alpha-olefin. In some embodiments, the alpha-olefin is selected from the group consisting of propylene, 1-butene, 1-pentene, 1-hexene, 4-methyl-1-pentene, 1-heptene, 1-octene, 1-nonene and 1-decene. In other embodiments, the alpha-olefin is selected from the group consisting of propylene, 1-butene, 1-hexene, and 1-octene. In further embodiments, the alpha-olefin is selected from the group consisting of 1-hexene and 1-octene.

Exemplary ethylene/alpha-olefin elastomers for use in a cling layer are commercially available under the trade names AFFINITY™ from the Dow Chemical Company, ENGAGE™ from the Dow Chemical Company, INFUSE™ from the Dow Chemical Company, EXACT from Exxon-Mobil Chemical, and TAFMER™ from Mitsui Chemicals, Inc. Suitable ethylene/alpha-olefin elastomers are further described in U.S. Pat. No. 5,272,236 (Lai et al.), U.S. Pat. No. 6,486,284 (Karande et al.), and U.S. Pat. No. 6,100,341 (Friedman), which are incorporated herein by reference.

Ethylene/alpha-olefin elastomers may be produced using single-site catalysts. Methods for producing olefin polymers using single site catalysts are described in U.S. Pat. No. 5,272,236 (Lai et al.) and U.S. Pat. No. 6,486,284 (Karande et al.), the entireties of which patents are incorporated herein by reference. Single-site catalyst systems may include metallocene catalysts and post-metallocene catalysts. In exemplary embodiments, the ethylene/alpha-olefin elastomer may be produced by a metallocene catalyst or a post-metallocene catalyst.

In some embodiments, the ethylene/alpha-olefin elastomer can include one or more olefin block copolymers. Olefin block copolymers are polymers comprising two or more chemically distinct regions or segments (referred to as "blocks") that may be joined in a linear manner, that is, a polymer comprising chemically differentiated units, which are joined end-to-end with respect to polymerized ethylenic functionality, rather than in pendent or grafted fashion. The blocks may differ in the amount or type of incorporated comonomer, density, amount of crystallinity, crystallite size attributable to a polymer of such composition, type or degree of tacticity (isotactic or syndiotactic), regio-regularity or regio-irregularity, amount of branching (including long chain branching or hyper-branching), homogeneity or any other chemical or physical property. Suitable olefin block copolymers are further described in U.S. Pat. No. 7,608,668, which is incorporated herein by reference.

In embodiments described herein, the ethylene/alpha-olefin elastomers have a density in the range of 0.855 to 0.890 grams/cc. All individual values and subranges of from 0.855 g/cc to 0.890 g/cc are included and disclosed herein. For example, in some embodiments, the ethylene/alpha-olefin elastomers may have a density of from 0.860 g/cc to 0.890 g/cc. In other embodiments, the ethylene/alpha-olefin elastomers may have a density of from 0.865 g/cc to 0.890 g/cc. Density may be measured according to ASTM D792.

In addition to the density, the ethylene/alpha-olefin elastomers have a melt index ($I_2$) in the range of 0.1 to 30 grams/10 minutes. All individual values and subranges of from of 0.1 to 30 grams/10 minutes are included and disclosed herein. For example, in some embodiments, the ethylene/alpha-olefin elastomers may have a melt index ($I_2$) in the range of 0.1 to 20 grams/10 minutes. In other embodiments, the ethylene/alpha-olefin elastomers may have a melt index ($I_2$) in the range of 0.1 to 15 grams/10 minutes. In further embodiments, the ethylene/alpha-olefin elastomers may have a melt index ($I_2$) in the range of 0.1 to 10 grams/10 minutes. Melt index ($I_2$) may be measured according to ASTM D1238, condition 190° C./2.16 kg.

The ethylene/alpha-olefin elastomer can be incorporated into a cling layer formulation in an amount based on a variety of factors, such as, amounts of other polymers (e.g., ULDPE or ultra-low density polyethylene and VLDPE or very low density polyethylene), desired tack/cling; cost; tack stability during manufacturing, transportation, storage, and/or use conditions. In some embodiments, the ethylene/alpha-olefin elastomer is present in the cling layer in an amount in the range of 20 to 90 percent by weight of the cling layer, in the range of 25 to 90 percent by weight of the cling layer, in the range of 30 to 90 percent by weight of the cling layer, or even in the range of 40 to 85 percent by weight of the cling layer. Of course, all individual values and subranges of 20 to 90 percent by weight of the cling layer are included and disclosed herein.

The cling layer also comprises a polyethylene polymer selected from ULDPE, VLDPE, and combinations thereof. ULDPE and/or VLDPE can be incorporated into cling layer formulations in an amount based on a variety of factors, such as, the amounts of other ingredients (e.g., ethylene/alpha-olefin elastomer) present in the cling layer, desired tack/cling properties in the film; cost; tack stability during manufacturing, transportation, storage, and/or use conditions. In some embodiments, ULDPE and/or VLDPE is present in the cling layer in an amount in the range of 10 to 90 percent by weight of the cling layer, in the range of 20 to 85 percent by weight of the cling layer, in the range of 30 to 70 percent by weight of the cling layer, or even in the range of 35 to 70 percent by weight of the cling layer.

ULDPE or VLDPE comprises, in polymerized form, a majority weight percent of units derived from ethylene, based on the total weight of the ULDPE or VLDPE. The ULDPE or VLDPE may be an interpolymer of ethylene and at least one ethylenically unsaturated comonomer. In some embodiments, the comonomer is a C3-C20 alpha-olefin. In other embodiments, the comonomer is a C3-C8 alpha-olefin. In further embodiments, the C3-C8 alpha-olefin is selected from propylene, 1-butene, 1-hexene, or 1-octene. In even further embodiments, the ULDPE or VLDPE may be an ethylene/propylene copolymer, ethylene/butene copolymer, ethylene/hexene copolymer, or ethylene/octene copolymer.

ULDPE or VLDPE can be made using Ziegler-Natta catalyst techniques to provide a desired level of purge fraction. Ziegler-Natta catalysts are described in U.S. Publication Numbers 2008/0038571 (Klitzmiller et al.) and 2008/0176981 (Biscoglio et al.), the entirety of which publications are incorporated herein by reference. In some embodiments, Ziegler-Natta catalyzed ULDPE or VLDPE includes a copolymer of ethylene and 3.5 to 10.5 mol percent of at least one comonomer selected from the group consisting of $C_3$-$C_{20}$ α-olefins, dienes, and cycloalkenes. "ULDPE" and "VLDPE" can be used interchangeably. See, e.g., U.S. Publication Number 2008/0038571 (Klitzmiller et al.), the entirety of which is incorporated herein by reference. In some embodiments, VLDPE refers to ULDPEs or VLDPEs that are manufactured by gas phase reaction techniques and ULDPE refers to ULDPEs or VLDPEs that are manufactured by liquid phase (solution) reaction techniques. Suitable ULDPEs include ATTANE™ 4404 available from The Dow Chemical Company. Suitable VLDPEs include DFDB-9042 NT VLDPE, available from The Dow Chemical Company.

In embodiments described herein, the polyethylene polymer has a density of 0.885 to 0.915 g/cc. All individual values and subranges of from 0.885 to 0.915 g/cc are included and disclosed herein. For example, in some embodiments, the polyethylene polymer has a density of 0.885 to 0.910 g/cc. In other embodiments, the polyethylene polymer has a density of 0.890 to 0.915 g/cc. In further embodiments, the polyethylene polymer has a density of 0.890 to 0.912 g/cc. In even further embodiments, the polyethylene polymer has a density of 0.895 to 0.905 g/cc. In even further embodiments, the polyethylene polymer has a density of 0.899 to 0.905 g/cc. Density may be measured according to ASTM D792.

In addition to the density, the polyethylene polymer has a melt index ($I_2$) in the range of 0.1 to 30 grams/10 minutes. All individual values and subranges of from 0.1 to 30 grams/10 minutes are included and disclosed herein. For example, in some embodiments, the polyethylene polymer has a melt index ($I_2$) in the range of 0.1 to 25 g/10 minutes. In other embodiments, the polyethylene polymer has a melt index ($I_2$) in the range of 0.1 to 20 g/10 minutes. In further embodiments, the polyethylene polymer has a melt index ($I_2$) in the range of 0.1 to 15 g/10 minutes. In even further embodiments, the polyethylene polymer has a melt index ($I_2$) in the range of 0.1 to 10 g/10 minutes. In even further embodiments, the polyethylene polymer has a melt index ($I_2$) in the range of 0.5 to 10 grams/10 minutes. Melt index ($I_2$) may be measured according to ASTM D1238, condition 190° C./2.16 kg.

In addition to the density and melt index ($I_2$), the polyethylene polymer may have a molecular weight distribution ($M_w/M_n$) of from 3.0 to 6.0. Molecular weight distribution can be described as the ratio of weight average molecular weight ($M_w$) to number average molecular weight ($M_n$) (i.e., $M_w/M_n$), and can be measured by gel permeation chromatography techniques.

In addition to the density, melt index ($I_2$), and molecular weight distribution ($M_w/M_n$), the polyethylene polymer has a purge fraction of greater than 20 percent as determined by the Crystallization Elution Fractionation (CEF) test method. The purge fraction can qualitatively refer to branched (e.g., highly-branched) and non-crystallizable polyolefin copolymers that can be generated during a polymerization process via a Ziegler-Natta catalyst ("Z-N" catalyst), and become part of the final polyethylene product. Without being bound by theory, it is believed that a polyethylene polymer having a purge fraction of at least 20 wt. % as determined by the CEF test method can be blended with ethylene/alpha-olefin elastomer to provide a cling layer with desirable cling properties. In some embodiments, the polyethylene polymer has a purge fraction of greater than 22 percent, or greater than 25 percent. The polyethylene polymer may also have a purge fraction of less than 45 percent, or less than 40 percent. Of course, it should be understood that polyethylene polymers having higher purge fraction amounts may be utilized.

Without being bound by theory, it is believed that the combination of (i) an ethylene/alpha-olefin elastomer and (ii) a polyethylene polymer having a purge fraction greater than 20 percent, can provide similar or enhanced cling in the cling layer as compared to a cling layer having a higher level of PE (polyethylene) elastomer and no polyethylene polymer having a purge fraction greater than 20 percent. Specifically, it is believed that ethylene/alpha-olefin elastomers can give the cling layer a smooth surface (i.e., better surface conformability) while the polyethylene polymer having a purge fraction greater than 20 percent can enable a diffusion mechanism across the polymer interface to form entanglement within the polymer matrix. Reducing the amount of PE elastomer in a cling layer to provide desired cling properties can be advantageous as PE elastomer can be relatively expensive and/or can be difficult to process with blown film techniques when used at relatively high levels (e.g., greater than 90% by weight of a layer) because of its tackiness. Further, the cling layer can have desired cling properties without including polyisobutylene (PIB) (i.e., PIB-free). Eliminating the need for PIB additives can be advantageous as the additives are sometimes subjected to a time consuming aging period to migrate the additive to the surface of the film (i.e., bloom). In addition, the additives can be in liquid form, and therefore, drip to an undue degree from process equipment. Further, the additives may contaminate process equipment and/or cause two-sided cling where it is not desired.

The polyethylene polymer (ULDPE and/or VLDPE) may be incorporated into the cling layer at a sufficient level to permit a lower amount of ethylene/alpha-olefin elastomer present in the cling layer, while still providing desired cling properties. This can be advantageous as ethylene/alpha-olefin elastomers can be relatively more expensive than the polyethylene polymer (ULDPE and/or VLDPE). In addition, the ethylene/alpha-olefin elastomer can be difficult to process using blown film techniques, particularly, when the ethylene/alpha-olefin elastomer is present at relatively high levels (e.g., greater than 90 wt. %) in the cling layer due to its tackiness. In some embodiments, the cling layer may comprise 30 wt. % to 70 wt. % of the polyethylene polymer (ULDPE and/or VLDPE) and 70 wt. % to 30 wt. % of the ethylene/alpha-olefin elastomer.

Optionally, the cling layer can include one or more additives and/or additional polymers. For example, in some embodiments, the cling layer can optionally include low density polyethylene (LDPE) and/or linear low density polyethylene (LLDPE) as desired. Low density polyethylene can have a density in the range in the range of 0.915 to 0.935 grams/cm$^3$ and a melt index in the range of 0.1 to 30 grams/10 minutes. Linear low density polyethylene can have a density in the range of 0.912 to 0.940 grams/cm$^3$ and a melt index in the range of 0.5 to 30 grams/10 minutes. The cling layer can include LDPE in an amount from 0 to 30 percent by weight of the cling layer. The cling layer can include LLDPE in an amount from 0 to 30 percent by weight of the cling layer. In some embodiments, the cling layer can include LDPE in an amount from 0 to 30 percent by weight of the cling layer and LLDPE in an amount from 0 to 30 percent by weight of the cling layer.

The ethylene/alpha-olefin elastomer can be dry blended with the polyethylene polymer to form a cling layer blend. Methods of dry blending resins can be found in U. S. Pat. No. 3,318,538 (Needham), the entirety of which patent is incorporated herein by reference. The ethylene/alpha-olefin elastomer can also be melt-blended with the polyethylene polymer to form a cling layer blend. Methods of melt blending resins can be found in U. S. Pat. No. 6,111,019 (Arjunan et al.), the entirety of which patent is incorporated herein by reference. The cling layer blend can be used in an extrusion process to form a cling layer via, for e.g., blown film techniques.

Release Layer

The release layer comprises an ethylene/alpha-olefin resin. In embodiments herein, the release layer comprises from 20 wt. % to 90 wt. % of the ethylene/alpha-olefin resin. All individual values and subranges of from 20 wt. % to 90 wt. % are included and disclosed herein. For example, in some embodiments, the release layer comprises from 20 wt. % to 80 wt. %, 25 wt. % to 70 wt. %, 30 wt. % to 65 wt. %, or 30 wt. % to 60 wt. %, by weight of the release layer, of the ethylene/alpha-olefin resin.

The ethylene/alpha-olefin resin is characterized by having a density of 0.910 g/cc to 0.930 g/cc. All individual values and subranges of at least 0.910 g/cc to 0.930 g/cc are included and disclosed herein. For example, in some embodiments, the polyethylene has a density of 0.910 to 0.927 g/cc, 0.910 to 0.925 g/cc, 0.915 to 0.930 g/cc, 0.915 to 0.925 g/cc, or 0.916 to 0.922 g/cc. Density may be measured in accordance with ASTM D792.

In addition to density, the ethylene/alpha-olefin resin may have a melt index, $I_2$, of 0.1 g/10 min to 30.0 g/10 min All individual values and subranges of at least 0.1 g/10 min to 30.0 g/10 min are included and disclosed herein. For example, in some embodiments, the ethylene/alpha-olefin resin may have a melt index, $I_2$, of 0.1 g/10 min to 20.0 g/10 min, 0.1 g/10 min to 10.0 g/10 min, 0.1 g/10 min to 5.0 g/10 min, or 0.1 g/10 min to 2.0 g/10 min. In other embodiments, the ethylene/alpha-olefin resin may have a melt index, $I_2$, of 0.3 g/10 min to 1.2 g/10 min or 0.5 g/10 min to 1.5 g/10 min Melt index, $I_2$, may be measured in accordance with ASTM D1238 (190° C. and 2.16 kg).

In addition to the density and melt index, the ethylene/alpha-olefin resin may further be characterized by a purge fraction of less than 2% as determined by the Crystallization Elution Fractionation (CEF) test method. All individual values and subranges of less than 2% are included and disclosed herein. For example, in some embodiments, the ethylene/alpha-olefin resin may further be characterized by a purge fraction of less than 1% as determined by the Crystallization Elution Fractionation (CEF) test method.

In addition to the density, melt index, purge fraction, the ethylene/alpha-olefin resin may further be characterized by a composition distribution breadth index (CDBI) of greater than 55. All individual values and subranges of greater than 55 are included herein and disclosed herein.

The ethylene/alpha-olefin resin is the reaction product of ethylene and one or more alpha olefin comonomers. The ethylene/alpha-olefin resin comprises greater than 50 wt. % of the units derived from ethylene and less than 30 wt. % of the units derived from one or more alpha-olefin comonomers. In some embodiments, the ethylene/alpha-olefin resin comprises (a) greater than or equal to 75%, greater than or equal to 90%, greater than or equal to 95%, greater than or equal to 99%, by weight, of the units derived from ethylene; and (b) less than 30 percent, for example, less than 25 percent, less than 10%, less than 5%, less than 1%, by weight, of units derived from one or more a-olefin comonomers. The comonomer content may be measured using any suitable technique, such as techniques based on nuclear magnetic resonance ("NMR") spectroscopy, and, for example, by 13C NMR analysis as described in U.S. Pat. No. 7,498,282, which is incorporated herein by reference.

Suitable comonomers may include alpha-olefin comonomers, typically having no more than 20 carbon atoms. For example, the alpha-olefin comonomers may have 3 to 10 carbon atoms, or 3 to 8 carbon atoms. Exemplary alpha-olefin comonomers include, but are not limited to, propylene, 1-butene, 1-pentene, 1-hexene, 1-heptene, 1-octene, 1-nonene, 1-decene, and 4-methyl-1-pentene. The one or more alpha-olefin comonomers may, for example, be selected from the group consisting of propylene, 1-butene, 1-hexene, and 1-octene; or in the alternative, from the group consisting of 1-butene, 1-hexene and 1-octene. In some embodiments, the ethylene/alpha-olefin resin comprises greater than 0 wt. % and less than 30 wt. % of units derived from one or more of octene, hexene, or butene comonomers.

Any conventional ethylene (co)polymerization reaction processes may be employed to produce the ethylene/alpha-olefin resin characterized by the properties described herein. Such conventional ethylene (co)polymerization reaction processes include, but are not limited to, gas phase polymerization process, slurry phase polymerization process, solution phase polymerization process, and combinations thereof using one or more conventional reactors, e.g. fluidized bed gas phase reactors, loop reactors, stirred tank reactors, batch reactors in parallel, series, and/or any combinations thereof. Exemplary ethylene/alpha-olefin resins that may include the ELITE AT™ resins available from The Dow Chemical Company (Midland, Mich.), the EXCEED™ resins available from ExxonMobil Chemical Company (Houston, Tex.), the MARLEX™ D resins available from Chevron Phillips Chemical Company, or the SURPASS™ resins available from NOVA Chemical Company.

In one exemplary embodiment, the ethylene/alpha-olefin resin is prepared via a process comprising the steps of: (a) polymerizing ethylene and optionally one or more α-olefins in the presence of a first catalyst to form a semi-crystalline ethylene-based polymer in a first reactor or a first part of a multi-part reactor; and (b) reacting freshly supplied ethylene and optionally one or more α-olefins in the presence of a second catalyst comprising an organometallic catalyst thereby forming an ethylene/α-olefin interpolymer composition in at least one other reactor or a later part of a multi-part reactor, wherein at least one of the catalyst systems in step (a) or (b) comprises a metal complex of a polyvalent aryloxyether corresponding to the formula:

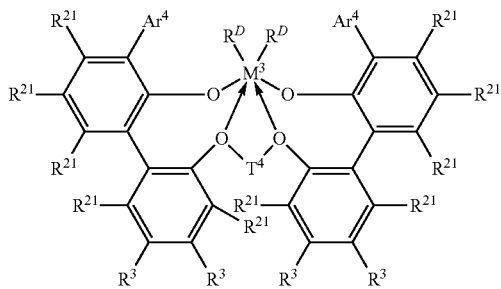

wherein $M^3$ is Ti, Hf or Zr, and, in one exemplary embodiment, $M^3$ is Zr;

$Ar^4$ is independently in each occurrence a substituted $C_{9-20}$ aryl group, wherein the substituents, independently in each occurrence, are selected from the group consisting of alkyl; cycloalkyl; and aryl groups; and halo-, trihydrocarbylsilyl- and halohydrocarbyl-substituted derivatives thereof, with the proviso that at least one substituent lacks co-planarity with the aryl group to which it is attached;

$T^4$ is independently in each occurrence a $C_{2-20}$ alkylene, cycloalkylene or cycloalkenylene group, or an inertly substituted derivative thereof;

$R^{21}$ is independently in each occurrence hydrogen, halo, hydrocarbyl, trihydrocarbylsilyl, trihydrocarbylsilylhydrocarbyl, alkoxy or di(hydrocarbyl)amino group of up to 50 atoms not counting hydrogen;

$R^3$ is independently in each occurrence hydrogen, halo, hydrocarbyl, trihydrocarbylsilyl, trihydrocarbylsilylhydrocarbyl, alkoxy or amino of up to 50 atoms not counting hydrogen, or two $R^3$ groups on the same arylene ring together or an $R^3$ and an $R^{21}$ group on the same or different arylene ring together form a divalent ligand group attached to the arylene group in two positions or join two different arylene rings together; and $R^D$ is independently in each occurrence halo or a hydrocarbyl or trihydrocarbylsilyl group of up to 20 atoms not counting hydrogen, or 2 $R^D$ groups together are a hydrocarbylene, hydrocarbadiyl, diene, or poly(hydrocarbyl)silylene group.

In another exemplary embodiment, the ethylene/alpha-olefin resin may be produced by (co)polymerizing ethylene and optionally one or more α-olefin comonomer in the presence of a hafnium-based metallocene catalyst via a gas phase (co)polymerization process in a single stage reactor. A hafnium-based metallocene catalyst system including a cocatalyst, as described herein, ethylene, optionally one or more alpha-olefin comonomers, hydrogen, optionally one or more inert gases and/or liquids, e.g. N2, isopentane, and hexane, and optionally one or more continuity additive, e.g. ethoxylated stearyl amine or aluminum distearate or combinations thereof, are continuously fed into a reactor, e.g. a fluidized bed gas phase reactor. The reactor may be in fluid communication with one or more discharge tanks, surge tanks, purge tanks, and/or recycle compressors. The temperature in the reactor is typically in the range of 70 to 115° C., or 75 to 110° C., or 75 to 100° C., and the pressure is in the range of 15 to 30 atm, or 17 to 26 atm. A distributor plate at the bottom of the polymer bed provides a uniform flow of the upflowing monomer, comonomer, and inert gases stream. A mechanical agitator may also be provided to provide contact between the solid particles and the comonomer gas stream. The fluidized bed, a vertical cylindrical reactor, may have a bulb shape at the top to facilitate the reduction of gas velocity; thus, permitting the granular polymer to separate from the upflowing gases. The unreacted gases are then cooled to remove the heat of polymerization, recompressed, and then recycled to the bottom of the reactor. Once the residual hydrocarbons are removed, and the resin is transported under $N_2$ to a purge bin, moisture may be introduced to reduce the presence of any residual catalyzed reactions with $O_2$ before the ethylene/alpha-olefin resin is exposed to oxygen. The ethylene/alpha-olefin resin may then be transferred to an extruder to be pelletized. Such pelletization techniques are generally known.

The hafnium-based catalyst system, as used herein, refers to a catalyst capable of catalyzing the polymerization of ethylene monomers and optionally one or more α-olefin co monomers to produce polyethylene. Furthermore, the hafnium-based catalyst system comprises a hafnocene component. The hafnocene component may comprise mono-, bis- or tris-cyclopentadienyl-type complexes of hafnium. In one embodiment, the cyclopentadienyl-type ligand comprises cyclopentadienyl or ligands isolobal to cyclopentadienyl and substituted versions thereof. Representative examples of ligands isolobal to cyclopentadienyl include, but are not limited to, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "H4Ind") and substituted versions thereof. In one embodiment, the hafnocene component is an unbridged bis-cyclopentadienyl hafnocene and substituted versions thereof. In another embodiment, the hafnocene component excludes unsubstituted bridged and unbridged bis-cyclopentadienyl hafnocenes, and unsubstituted bridged and unbridged bis-indenyl hafnocenes. The term "unsubstituted," as used herein, means that there are only hydride groups bound to the rings and no other group. The hafnocene useful in the present invention can be represented by the formula (where "Hf" is hafnium):

$$CpnHfXp \quad (1)$$

wherein n is 1 or 2, p is 1, 2 or 3, each Cp is independently a cyclopentadienyl ligand or a ligand isolobal to cyclopentadienyl or a substituted version thereof bound to the hafnium; and X is selected from the group consisting of hydride, halides, C1 to C10 alkyls and C2 to C12 alkenyls; and wherein when n is 2, each Cp may be bound to one another through a bridging group A selected from the group consisting of C1 to C5 alkylenes, oxygen, alkylamine, silyl-hydrocarbons, and siloxyl-hydrocarbons. An example of C1 to C5 alkylenes include ethylene (—CH2CH2—) bridge groups; an example of an alkylamine bridging group includes methylamide (—(CH3)N—); an example of a silyl-hydrocarbon bridging group includes dimethylsilyl (—(CH3)2Si—); and an example of a siloxyl-hydrocarbon bridging group includes (—O—(CH3)2Si—O—). In one particular embodiment, the hafnocene component is represented by formula (1), wherein n is 2 and p is 1 or 2.

As used herein, the term "substituted" means that the referenced group possesses at least one moiety in place of one or more hydrogens in any position, the moieties selected from such groups as halogen radicals such as F, Cl, Br., hydroxyl groups, carbonyl groups, carboxyl groups, amine groups, phosphine groups, alkoxy groups, phenyl groups, naphthyl groups, C1 to C10 alkyl groups, C2 to C10 alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbamoyl radicals, alkyl- and dialkyl-carbamoyl radicals, acyloxy radicals, acylamino radicals, arylamino radicals, and combinations thereof. In an exemplary embodiments, the hafnocene component useful in the present invention can be represented by the formula:

$$(CpR5)2HfX2 \quad (2)$$

wherein each Cp is a cyclopentadienyl ligand and each is bound to the hafnium; each R is independently selected from hydrides and C1 to C10 alkyls, or, in an exemplary embodiment, hydrides and C1 to C5 alkyls; and X is selected from the group consisting of hydride, halide, C1 to C10 alkyls and C2 to C12 alkenyls, or, in an exemplary embodiment, X is selected from the group consisting of halides, C2 to C6 alkylenes and C1 to C6 alkyls, or, in an exemplary embodiment, X is selected from the group consisting of chloride, fluoride, C1 to C5 alkyls and C2 to C6 alkylenes. In another exemplary embodiment, the hafnocene is represented by formula (2) above, wherein at least one R group is an alkyl as defined above, or, in an exemplary embodiment, a C1 to C5 alkyl, and the others are hydrides. In another exemplary embodiment, each Cp is independently substituted with from one two three groups selected from the group consisting of methyl, ethyl, propyl, butyl, and isomers thereof.

The hafnocene-based catalyst system may be heterogeneous, i.e. the hafnocene-based catalyst may further comprise a support material. The support material can be any material known in the art for supporting catalyst compositions; for example an inorganic oxide; or in the alternative, silica, alumina, silica-alumina, magnesium chloride, graphite, magnesia, titania, zirconia, and montmorillonite, any of which can be chemically/physically modified such as by fluoriding processes, calcining or other processes known in the art. In one embodiment the support material is a silica material having an average particle size as determined by Malvern analysis of from 1 to 60 mm; or in the alternative, 10 to 40 mm The hafnium-based catalyst system may further comprise an activator. Any suitable activator known to activate catalyst components towards olefin polymerization may be suitable. In one embodiment, the activator is an alumoxane; in the alternative methalumoxane such as described by J. B. P. Soares and A E Hamielec in 3(2) POLYMER REACTION ENGINEERING 131 200 (1995). The alumoxane may be co-supported on the support material in a molar ratio of aluminum to hafnium (Al:Hf) ranging from 80:1 to 200:1, or 90:1 to 140:1. Hafnium-based catalyst systems are further described in details in the U.S. Pat. No. 6,242,545 and U.S. Pat. No. 7,078,467, which are incorporated herein by reference.

In embodiments described herein, the release layer may further comprise one or more of low density polyethylene (LDPE), linear low density polyethylene (LLDPE), polypropylene, and/or ethylene vinyl acetate (EVA). In some embodiments, the release layer may further comprise an LDPE. In other embodiments, the release layer may further comprise an LDPE present in an amount ranging from 1 wt. % to 80 wt. %, 20 wt. % to 80 wt. %, 20 wt. % to 70 wt. %, 30 wt. % to 70 wt. %, or 40 wt. % to 70 wt. %, by weight of the release layer. Also, in some embodiments, the release layer may further comprise an LLDPE. In other embodiments, the release layer may further comprise an LLDPE in an amount ranging from 1 wt. % to 80 wt. %, 1 wt. % to 50 wt. %, 1 wt. % to 25 wt. %, 5 wt. % to 25 wt. %, or 5 wt. % to 20 wt. %, by weight of the release layer. The LDPE may have a density in the range of 0.915 to 0.935 grams/cm³ and a melt index in the range of 0.1 to 30 grams/10 minutes. The LLDPE may have a density in the range in the range of 0.912 to 0.940 grams/cm³ and a melt index in the range of 0.5 to 30 grams/10 minutes.

Core Layer

Optionally, a multilayer film described herein can include one or more core layers positioned between the cling layer and the release layer. In some embodiments, the multilayer film comprises a core layer positioned between the cling layer and the release layer. In other embodiments, the multilayer film comprises a single core layer positioned between and contacting at least a portion of the cling layer and the release layer.

The core layer can include one or more of LLDPE, LDPE, ethylene/alpha-olefin elastomer, polypropylene elastomer, and/or ethylene vinyl acetate (EVA). In some embodiments, the core layer comprises LLDPE in an amount from 0 to 100 percent, 25 to 100 percent, 30 to 100 percent, 40 to 100 percent, 50 to 100 percent, 60 to 100 percent, 65 to 100 percent, 70 to 100 percent, 75 to 100 percent, by weight of the core layer. In other embodiments, the core layer comprises LLDPE and one or more of ethylene/alpha-olefin elastomer, polypropylene elastomer, or ethylene vinyl acetate. The one or more of ethylene/alpha-olefin elastomer, polypropylene elastomer, or ethylene vinyl acetate may be present in amounts ranging from 1 to 30 percent, 1 to 25 percent, 1 to 20 percent, or 1 to 15 percent, by weight, of the core layer. In further embodiments, the core layer may comprise LLDPE and LDPE. The LDPE may be present in amounts ranging from 1 to 50 percent, 1 to 35 percent, 1 to 25 percent, or 1 to 20 percent, by weight, of the core layer. Exemplary LLDPE for use in the core layer of a multilayer film is commercially available under the trade names ELITE™, TUFLIN™, and DOWLEX™ from the Dow Chemical Company.

In some embodiments, the core layer comprises a LLDPE. The LLDPE may have a density ranging from 0.912 g/cc to 0.930 g/cc or 0.915 g/cc to 0.925 g/cc. In addition to the density, the LLDPE may have a melt index ranging from 0.5 g/10 min to 1.5 g/10 min.

The multilayer films described herein can be made by a variety of techniques, such as, blown film techniques. Methods of making multilayer blown films are described in U.S. Pat. No. 6,521,338 (Maka), the entirety of which patent is incorporated herein by reference. For example, in some embodiments, a multilayer blown film can be made by co-extruding a cling layer composition with the release layer composition (and, optionally, a core layer composition) in an extruder to form a tube having a cling layer and a release layer, and cooling the tube to form a multilayer blown stretch film.

Embodiments of the multilayer films will now be further described in the following illustrative examples.

Test Methods
Density

Density can be measured in accordance with ASTM D-792.

Melt Index

Melt index ($I_2$) can be measured in accordance with ASTM D-1238, Procedure B (condition 190° C./2.16 kg). Melt index ($I_{10}$) can be measured in accordance with ASTM D-1238, Procedure B (condition 190° C./10.0 kg).

Crystallization Elution Fractionation (CEF) Method

The Crystallization Elution Fractionation (CEF) technology is conducted according to Monrabal et al, Macromol. Symp. 257, 71-79 (2007). The CEF instrument is equipped with an IR-4 or IR-5 detector (such as that sold commercially from PolymerChar, Spain) and a two angle light scattering detector Model 2040 (such as those sold commercially from Precision Detectors). A 10 micron guard column of 50 mm×4.6 mm (such as that sold commercially from PolymerLabs) is installed before the IR-4 or IR-5 detector in the detector oven. Ortho-dichlorobenzene (ODCB, 99% anhydrous grade) and 2,5-di-tert-butyl-4-methylphenol (BHT) (such as commercially available from Sigma-Aldrich) are obtained. Silica gel 40 (particle size 0.2-0.5 mm) (such as commercially available from EMD Chemicals) is also obtained. The silica gel is dried in a vacuum oven at 160° C. for at least two hours before use. ODCB is sparged with dried nitrogen ($N_2$) for one hour before use. Dried nitrogen is obtained by passing nitrogen at <90 psig over $CaCO_3$ and 5 Å molecular sieves. ODCB is further dried by adding five grams of the dried silica to two liters of ODCB or by pumping through a column or columns packed with dried silica between 0.1 ml/min to 1.0 ml/min. Eight hundred milligrams of BHT are added to two liters of ODCB if no inert gas such as $N_2$ is used in purging the sample vial. Dried ODCB with or without BHT is hereinafter referred to as "ODCB-m." A sample solution is prepared by, using the autosampler, dissolving a polymer sample in ODCB-m at 4 mg/ml under shaking at 160° C. for 2 hours. 300 μL of the sample solution is injected into the column. The temperature profile of CEF is: crystallization at 3° C./min from 110° C. to 30° C., thermal equilibrium at 30° C. for 5 minutes (including Soluble Fraction Elution Time being set as 2 minutes), and elution at 3° C./min from 30° C. to 140° C. The flow rate during crystallization is 0.052 ml/min The flow rate during elution is 0.50 ml/min The IR-4 or IR-5 signal data is collected at one data point/second.

The CEF column is packed with glass beads at 125 μm±6% (such as those commercially available with acid wash from MO-SCI Specialty Products) with 1/8 inch stainless tubing according to U.S. Pat. No. 8,372,931. The internal liquid volume of the CEF column is between 2.1 ml and 2.3 ml. Temperature calibration is performed by using a mixture of NIST Standard Reference Material linear polyethylene 1475a (1.0 mg/ml) and Eicosane (2 mg/ml) in ODCB-m. The calibration consists of four steps: (1) calculating the delay volume defined as the temperature offset between the measured peak elution temperature of Eicosane minus 30.00° C.; (2) subtracting the temperature offset of the elution temperature from the CEF raw temperature data. It is noted that this temperature offset is a function of experimental conditions, such as elution temperature, elution flow rate, etc.; (3) creating a linear calibration line transforming the elution temperature across a range of 30.00° C. and 140.00° C. such that NIST linear polyethylene 1475a has a peak temperature at 101.00° C., and Eicosane has a peak temperature of 30.00° C., (4) for the soluble fraction measured isothermally at 30° C., the elution temperature is extrapolated linearly by using the elution heating rate of 3° C./min. The reported elution peak temperatures are obtained such that the observed comonomer content calibration curve agrees with those previously reported in U.S. Pat. No. 8,372,931.

The CEF chromatogram is divided into three zones, the elution temperature range of each zone is specified in Table 3. The wt. % of the lowest temperature zone is generally called the wt. % of Zone 1 or the wt. % of the purge fraction. The wt. % of the intermediate temperature zone is generally called the wt. % of Zone 2 or the wt. % of the copolymer fraction. The wt. % of the highest temperature zone is generally called the wt. % of Zone 3 or the wt. % of the high density fraction.

Comonomer Distribution Breadth Index (CDBI)

The CDBI is calculated using the methodology described in WO/93/03093 from data obtained from CEF. CDBI is defined as the weight percent of the polymer molecules having a comonomer content within 50 percent of the median total molar comonomer content. It represents a comparison of the comonomer distribution in the polymer to the comonomer distribution expected for a Bernoullian distribution.

CEF is used to measure the short chain branching distribution (SCBD) of the polyolefin. A CEF molar comonomer content calibration is performed using 24 reference materials (e.g., polyethylene octene random copolymer and ethylene butene copolymer) with a narrow SCBD having a comonomer mole fraction ranging from 0 to 0.108 and a Mw from 28,400 to 174,000 g/mole. The ln (mole fraction of ethylene), which is the ln (comonomer mole fraction), versus 1/T (K) is obtained, where T is the elution temperature in Kelvin of each reference material. The comonomer distribution of the reference materials is determined using 13C NMR analysis in accordance with techniques described, for example, in U.S. Pat. No. 5,292,845 (Kawasaki, et al.) and by J. C. Randall in Rev. Macromol. Chem. Phys., C29, 201-317.

Nuclear Magnetic Resonance ($^1$H NMR)

The samples were prepared by adding approximately 130 mg of sample to "3.25 g of 50/50, by weight, tetrachlorethane-$d_2$/perchloroethylene (TCE-$d_2$)" with 0.001 M Cr(A-cAc)$_3$ in a NORELL 1001-7, 10 mm NMR tube. The samples were purged by bubbling $N_2$ through the solvent, via a pipette inserted into the tube, for approximately five minutes, to prevent oxidation. Each tube was capped, sealed with TEFLON tape, and then soaked at room temperature, overnight, to facilitate sample dissolution. The samples were heated and vortexed at 115° C. to ensure homogeneity.

The $^1$H NMR was performed on a Bruker AVANCE 400 MHz spectrometer, equipped with a Bruker Dual DUL high-temperature CryoProbe, and a sample temperature of 120° C. Two experiments were run to obtain spectra, a control spectrum to quantitate the total polymer protons, and a double presaturation experiment, which suppressed the intense polymer backbone peaks, and enabled high sensitivity spectra for quantitation of the end-groups. The control was run with ZG pulse, 16 scans, AQ 1.64 s, D1 14 s. The double presaturation experiment was run with a modified pulse sequence, 100 scans, AQ 1.64 s, presaturation delay ls, relaxation delay 13 s.

The signal from residual $^1$H in TCE-$d_2$ (at 6.0 ppm) was integrated, and set to a value of 100, and the integral from 3 to −0.5 ppm was used as the signal from the whole polymer in the control experiment. For the presaturation experiment, the TCE signal was also set to 100, and the corresponding integrals for unsaturation (vinylene at about 5.40 to 5.60 ppm, trisubstituted at about 5.16 to 5.35 ppm, vinyl at about 4.95 to 5.15 ppm, and vinylidene at about 4.70 to 4.90 ppm) were obtained.

In the presaturation experiment spectrum, the regions for cis- and trans-vinylene, trisubstituted, vinyl, and vinylidene were integrated. The integral of the whole polymer from the control experiment was divided by two to obtain a value representing X thousands of carbons (i.e., if the polymer integral=28000, this represents 14,000 carbons, and X=14).

The unsaturated group integrals, divided by the corresponding number of protons contributing to that integral, represent the moles of each type of unsaturation per X thousand carbons. Dividing the moles of each type of unsaturation by X, then gives moles unsaturated groups per 1000 moles of carbons.

Cling

On-pallet stretch cling (for stretch cling performance) can be measured by Lantech SHS test equipment. The test consists of stretching the film at 200% at a constant force F2 of 8 lbs. for 6 wraps with the turntable running at a rate of 10 rpm. The end of the film is then attached to a load cell which measures the amount of force, in grams, needed to pull the film off the drum.

Unwind Force

Unwind force of the films during unwinding was determined using the Highlight Stretch Film Test Stand (from Highlight Industries). The film is unwound from a sample roll having a width of 20 inches and a gauge of 1 mil, and a load cell attached to the apparatus, measures the unwind force respectively. The unwinding speed is 355 ft. per minute and the stretch level is 200%.

EXAMPLES

Multilayer Films

Multilayer blown films were made having a cling layer, core layer, and release layer. The film gauge is 1 mil and structure is cling (15%)/core (70%)/release (15%). The core layer consists of 100 wt % DOWLEX 2045G and the cling layer consists of 65 wt % AFFINITY™ EG 8100G PE Elastomer and 35% SAMPLE 1 ULDPE.

The resins used in the cling and core layers are shown in Table 1. The resins in Table 1 are available from the Dow Chemical Company.

TABLE 1

Resins Used in the Cling and Core Layers

| Product | Density (g/cm$^3$) | Melt index (MI or I2) (g/10 min) | Purge fraction, as determined by CEF (wt. %) |
|---|---|---|---|
| Resin for cling layer | | | |
| SAMPLE 1 ULDPE | 0.900 | 5.0 | 32 |
| AFFINITY ™ EG 8100G PE Elastomer | 0.870 | 1.0 | Not applicable |
| Resin for core layer | | | |
| DOWLEX ™ 2045G LLDPE | 0.920 | 1.0 | 4.2 |

Preparation of the Ziegler-Natta (Z-N) Catalyst to make Sample 1 ULDPE

The Z-N catalyst was prepared according to the following procedure. Ethylaluminium dichloride (EADC) solution (15 wt. % EADC dissolved in Isopar E (available from ExxonMobil Chemical Co., Houston, Tex.)) was transferred into the stirred vessel containing magnesium chloride (MgCl$_2$) slurry (0.2M in Isopar E) and aged while stirring for 6 hours prior to use. Titanium tetraisopropoxide (Ti(OiPr)$_4$) was transferred to the MgCl$_2$/EADC slurry vessel, followed by at least 8 hours of aging to obtain the procatalyst. The ratio of MgCl$_2$:EADC:Ti(OiPr)$_4$ was such that the metal ratio (Mg: Al:Ti) in the procatalyst was 40:12.5:3.

Preparation of Sample 1 ULDPE

A solution polymerization reactor system was used. A hydrocarbon solvent and monomer (ethylene) were injected into the reactor as a liquid. Comonomer (1-octene) was mixed with the liquid solvent. This feed stream was cooled to less than 20° C. before injection into the reactor system. The reactor system was operated at polymer concentrations in excess of 10 wt. %. The adiabatic temperature rise of the solution accounts for the heat removal from the polymerization reactions.

The solvent used in the solution polyethylene process was a high purity iso-paraffinic fraction of C6-C8 hydrocarbons. Fresh 1-octene was purified and mixed with the recycle solvent stream (contained solvent, ethylene, 1-octene, and hydrogen). After mixing with the recycle stream the combined liquid stream was further purified before using a 600-1000 psig pressure feed pump to pump the contents to the reactor. Fresh ethylene was purified and compressed to 600-1000 psig. Hydrogen (a telogen used to reduce molecular weight) and ethylene were flow controlled into the recycle solvent stream and the total feed stream was cooled to the appropriate feed temperature, which can be <40° C. The process used the Ziegler-Natta catalyst described above to catalyze the polymerization reactions. The reactor was operated at pressures >400 psig and temperatures in excess of 70° C. The ethylene conversion was maintained in the reactor by controlling the catalyst injection rate. The residence time was relatively short (less than 30 minutes). The ethylene conversion per reaction pass was greater than 80 wt. % ethylene.

Upon exiting the reactor, water and antioxidant additives were injected in the polymer solution. The water hydrolyzed the catalyst, terminating the polymerization reaction. Some of the additives such as antioxidants remained with the polymer and function as stabilizers to prevent polymer degradation. The post reactor solution was superheated from reactor temperature (>70 Deg C) to 210-260 Deg C in preparation for a two-stage devolatization to recover the solvent and unreacted monomers. Residual volatiles in the polymer were less than 2,000 ppm by weight. The polymer melt was pumped to a die for underwater pellet cutting.

Release Layer

The release layer consists of a blend of a low density polyethylene (LDPE) and an ethylene/alpha-olefin resin. The low density polyethylene has a 0.922 g/cc density and a melt index, $I_2$, of 1.9 g/10 min, and is produced in a high pressure, free radical process (LDPE 501I, available from the Dow Chemical Company, Midland, Mich.). The inventive ethylene/alpha-olefin resins and comparative resins are shown in Tables 2-4 below. EXCEED™ 1018 is available from the ExxonMobil Corporation. DOWLEX™ 2045G, DOWLEX™ 2247G, TUFLIN™ HS-7046, ELITE AT™ 6301 and ELITE AT™ 6401 are available from The Dow Chemical Company.

TABLE 2

Characterization of Ethylene/Alpha-Olefin Resins in Release Layer

|  | Product | Density (g/cm³) | MI (g/10 min) | Purge fraction (wt. %) |
|---|---|---|---|---|
| Inventive | EXCEED™ 1018 | 0.918 | 1.0 | 0.60 |
|  | ELITE AT™ 6401 | 0.912 | 0.85 | 0.44 |
|  | ELITE AT™ 6301 | 0.916 | 1.0 | 0.41 |
| Comparative | DOWLEX™ 2045G | 0.920 | 1.0 | 4.2 |
|  | DOWLEX™ 2247G | 0.917 | 2.3 | 7.0 |
|  | TUFLIN™ HS-7046 | 0.919 | 1.0 | 12 |

TABLE 3A

CEF and CDBI Data

| | | Peak Temp and Temperature Range (in parenthesis) of Each Zone (° C.) | | |
|---|---|---|---|---|
| | Type | Zone 1 | Zone 2 | Zone 3 |
| Inventive | EXCEED™ 1018 | 29.4 (25.04~31.98) | 86.0 (32.03~85.97) | 87.2 (86.07~119.95) |
| | ELITE AT™ 6401 | 28.99 (25.02~34.48) | 83.7 (34.57~100.98) | 101.27 (101.07~119.95) |
| | ELITE AT™ 6301 | 29.29 (26.35~31.98) | 85.6 (32.02~97.98) | 98.17 (98.06~109.99) |
| Comparative | DOWLEX™ 2045G | 28.4 (25.18~32.00) | 83.3 (32.05~92.97) | 98.9 (93.06~119.99) |
| | DOWLEX™ 2247G | 28.62 (25.61~34.47) | 80.27 (34.58~91.93) | 98.38 (92.03~111.97) |
| | TUFLIN™ HS-7046 | 28.1 (26.03~31.98) | 86.2 (32.03~92.46) | 99.2 (92.52~107.97) |

TABLE 3B

CEF and CDBI Data

| | | Wt % of Each zone | | | |
|---|---|---|---|---|---|
| | Type | Zone 1 | Zone 2 | Zone 3 | CDBI |
| Inventive | EXCEED™ 1018 | 0.60 | 52.0 | 47.1 | 61.1 |
| | ELITE AT™ 6401 | 0.44 | 99.32 | 0.24 | 85.5 |
| | ELITE AT™ 6301 | 0.41 | 99.29 | 0.3 | 88.1 |
| Comparative | DOWLEX™ 2045G | 4.2 | 66.0 | 29.7 | 35.4 |
| | DOWLEX™ 2247G | 7.26 | 70.65 | 22.09 | 44.4 |
| | TUFLIN™ HS-7046 | 15.2 | 47.5 | 37.3 | 21.5 |

Films

Three layer blown films were made using a Hosokawa Alpine 7-layer blown film line. The cling layer (outside of the bubble) with layer ratio of 15% is produced from extruder 1. The core layer with layer ratio of 70% is produced from extruder 2, 3, 4, 5 and 6. The release layer (inside of the bubble) with layer ratio of 15% is produced from extruder 7. All extruders are groove-feed and L/D ratio is 30 with diameter of 50 mm Melt temperature of extrusion for all extruders is ranged from 450 to 480° F. and die temperature is 450° F. Die gap is 78.7 mil. Blow up ratio is 2.5 and film gauge is 1 mil. Output rate is 300 lbs/hr. The film structures are further outlined in Table 4 below.

TABLE 4

Blown Film Structures

| | Cling Layer (15% of Overall Film) | Core Layer (70% of Overall Film) | Release Layer (15% of Overall Film) |
|---|---|---|---|
| Inv. Film 1 | 65 wt. % AFFINITY ™ 8100G 35 wt. % Sample 1 ULDPE | 100 wt. % DOWLEX ™ 2045G | 25 wt. % EXCEED ™ 1018 75 wt. % LDPE 501I |
| Inv. Film 2 | 65 wt. % AFFINITY ™ 8100G 35 wt. % Sample 1 ULDPE | 100 wt. % DOWLEX ™ 2045G | 25 wt. % ELITE AT ™ 6401 75 wt. % LDPE 501I |
| Inv. Film 3 | 65 wt. % AFFINITY ™ 8100G 35 wt. % Sample 1 ULDPE | 100 wt. % DOWLEX ™ 2045G | 50 wt. % EXCEED ™ 1018 50 wt. % LDPE 501I |
| Inv. Film 4 | 65 wt. % AFFINITY ™ 8100G 35 wt. % Sample 1 ULDPE | 100 wt. % DOWLEX ™ 2045G | 50 wt. % ELITE AT ™ 6301 50 wt. % LDPE 501I |
| Inv. Film 5 | 65 wt. % AFFINITY ™ 8100G 35 wt. % Sample 1 ULDPE | 100 wt. % DOWLEX ™ 2045G | 50 wt. % ELITE AT ™ 6401 50 wt. % LDPE 501I |
| Comp.Film 1 | 65 wt. % AFFINITY ™ 8100G 35 wt. % Sample 1 ULDPE | 100 wt. % DOWLEX ™ 2045G | 25 wt. % DOWLEX ™ 2045 G 75 wt. % LDPE 501I |
| Comp. Film 2 | 65 wt. % AFFINITY ™ 8100G 35 wt. % Sample 1 ULDPE | 100 wt. % DOWLEX ™ 2045G | 25 wt. % TUFLIN ™ HS-7046 75 wt. % LDPE 501I |
| Comp. Film 3 | 65 wt. % AFFINITY ™ 8100G 35 wt. % Sample 1 ULDPE | 100 wt. % DOWLEX ™ 2045G | 25 wt. % DOWLEX ™ 2247G 75 wt. % LDPE 501I |
| Comp. Film 4 | 65 wt. % AFFINITY ™ 8100G 35 wt. % Sample 1 ULDPE | 100 wt. % DOWLEX ™ 2045G | 50 wt. % DOWLEX ™ 2045 G 50 wt. % LDPE 501I |
| Comp. Film 5 | 65 wt. % AFFINITY ™ 8100G 35 wt. % Sample 1 ULDPE | 100 wt. % DOWLEX ™ 2045G | 50 wt. % TUFLIN ™ HS-7046 50 wt. % LDPE 501I |
| Comp. Film 6 | 65 wt. % AFFINITY ™ 8100G 35 wt. % Sample 1 ULDPE | 100 wt. % DOWLEX ™ 2045G | 50 wt. % DOWLEX ™ 2247G 50 wt. % LDPE 501I |

TABLE 5

The Effect of Release Layer Formulation on Stretch Cling Performance

| Film # | Cling Force (g) per 20 inch film width | Unwind force (g) per 20 inch film width |
|---|---|---|
| Inv. Film 1 | 197.5 | 23 |
| Inv. Film 2 | 196.9 | 29 |
| Inv. Film 3 | 180.2 | 23 |
| Inv. Film 4 | 195.4 | 18 |
| Inv. Film 5 | 212.7 | 27 |
| Comp. Film 1 | 138.8 | 32 |
| Comp. Film 2 | 245.5 | 50 |
| Comp. Film 3 | 214.9 | 39 |
| Comp. Film 4 | 203.1 | 34 |

TABLE 5-continued

The Effect of Release Layer Formulation on Stretch Cling Performance

| Film # | Cling Force (g) per 20 inch film width | Unwind force (g) per 20 inch film width |
|---|---|---|
| Comp. Film 5 | Unmeasurable | Unmeasurable - film blocked |
| Comp. Film 6 | 210 | 50 |

As shown in Table 5, the inventive films exhibit both good cling force performance as well as low unwind force, whereas the comparative films exhibit poor unwind force and/or cling force.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A multilayer blown film comprising a cling layer and a release layer, wherein:
    the cling layer comprises:
    (i) an ethylene/alpha-olefin elastomer that is not an olefin block copolymer comprising greater than 50%, by weight, of units derived from ethylene, and having a density in the range of 0.855 to 0.890 grams/cm$^3$ and a melt index, $I_2$, in the range of 0.1 to 30 grams/10 minutes; and
    (ii) a polyethylene polymer selected from ultra-low density polyethylene, a very low density polyethylene, or combinations thereof, wherein the polyethylene polymer has a density in the range of 0.885 to 0.915 grams/cm$^3$, a melt index, $I_2$, in the range of 0.1 to 30 grams/10 minutes, and a purge fraction greater than 20 percent as determined by a Crystallization Elution Fractionation (CEF) test method; and
    the release layer comprises an ethylene/alpha-olefin resin that is characterized by the following properties:
    (a) a melt index, $I_2$, of from 0.1 to 30.0 g/10 min;
    (b) a density of from 0.910 to 0.930 g/cc; and
    (c) a purge fraction of less than 2% as determined by Crystallization Elution Fractionation (CEF) test method;
    wherein the release layer further comprises a low density polyethylene.

2. The film of claim 1, wherein the release layer comprises from 20 wt. % to 90 wt. % of the ethylene/alpha-olefin resin.

3. The film of claim 1, wherein the ethylene/alpha-olefin resin of the release layer has a purge fraction of less than 1%.

4. The film of claim 1, wherein the ethylene/alpha-olefin resin of the release layer has a melt index of from 0.1 to 2.0 g/10 min.

5. The film of claim 1, wherein the ethylene/alpha-olefin resin of the release layer is further characterized by a composition distribution breadth index (CDBI) of greater than 55.

6. The film of claim 1, wherein the cling layer comprises from 20 wt. % to 90 wt. % of the ethylene/alpha-olefin elastomer.

7. The film of claim 1, wherein the film further comprises a core layer positioned between the cling layer and the release layer.

8. The film of claim 1, wherein the cling layer has a thickness that is from 5-30 percent of the overall thickness of the film.

9. The film of claim 1, wherein the release layer has a thickness that is from 5-30 percent of the overall thickness of the film.

10. A method of making the multilayer blown film of claim 1, the method comprising:
    providing a cling layer composition comprising (i) an ethylene/alpha-olefin elastomer that is not an olefin block copolymer having a density in the range of 0.855 to 0.890 grams/cm$^3$ and a melt index, $I_2$, in the range of 0.1 to 30 grams/10 minutes; and (ii) a polyethylene polymer selected from ultra-low density polyethylene, a very low density polyethylene, or combinations thereof, wherein the polyethylene polymer has a density in the range 0.885 to 0.915 grams/cm$^3$, a melt index, $I_2$, in the range of 0.1 to 30 grams/10 minutes, and a purge fraction greater than 20 percent as determined by the Crystallization Elution Fractionation (CEF) test method;
    providing a release layer composition comprising a low density polyethylene and comprising an ethylene/alpha-olefin resin that is characterized by the following properties: (a) a melt index, $I_2$, of from 0.1 to 30.0 g/10 min; (b) a density of from 0.910 to 0.930 g/cc; and (c) a purge fraction of less than 2% as determined by the Crystallization Elution Fractionation (CEF) test method;
    coextruding the cling layer composition with the release layer composition in an extruder to form a tube having a cling layer and a release layer; and
    cooling the tube to form a multilayer blown stretch film.

* * * * *